INVENTOR.
FORREST T. NETTLES
BY
ATTORNEY

United States Patent Office 3,339,865
Patented Sept. 5, 1967

3,339,865
ANTI-HYDROPLANING FOR AIRCRAFT
Forrest T. Nettles, 1128 Queens Road,
Charlotte, N.C. 28207
Filed Sept. 2, 1965, Ser. No. 484,610
1 Claim. (Cl. 244—103)

The present invention relates to aircraft landing gear and more particularly, to anti-skid devices for aircraft landing gear.

One of the problems associated with landing a relatively large and high speed turbine powered aircraft on a wet landing field is a tendency for the aircraft to hydroplane on the wet surface causing loss of control and skidding. It, therefore, would be desirable to disperse the water on a wet landing field from in front of the landing gear wheels in order to minimize the tendency of hydroplaning and skidding.

It is a principal object of the present invention to provide an improved landing gear apparatus for a turbine powered aircraft that is effective to disperse water on the landing field from in front of the landing gear wheels so as to prevent hydroplaning.

Another object of the present invention is to provide a novel turbine powered aircraft landing gear apparatus having pilot controlled water dispersing means that becomes automatically effective upon touchdown of the aircraft on a wet landing field to disperse water from in front of the landing gear wheels.

In accordance with the present invention, hot, dry air under high pressure is bled from a compressor stage of an aircraft turbine engine and is conducted to a nozzle on each landing gear strut near the wheel axle that is so constructed and arranged as to direct the compressed air with a predetermined pattern downwardly in front of the landing wheel in a manner to vaporize and disperse water from in front of the landing wheel thus leaving a relatively dry surface for the landing wheel to traverse without hydroplaning and skidding.

In a presently preferred arrangement of the invention, an electrically controlled bleed valve is provided in the ducting between the turbine engine and the landing gear nozzle so that the pilot may control the bleeding of air from the turbine engine for water dispersal by means of a manually operated electric switch. In addition, if desired, switches may be provided on each landing gear strut to be closed when the weight of the aircraft is placed on the landing strut at touch-down and connected in the pilot controlled switch circuit in a manner such that the bleed valve will be automatically opened only if the pilot switch is closed at the time that the plane touches down for a landing.

Further objects, features and advantages of the present invention will be apparent with reference to the following specification and drawing, in which.

Figure 1:
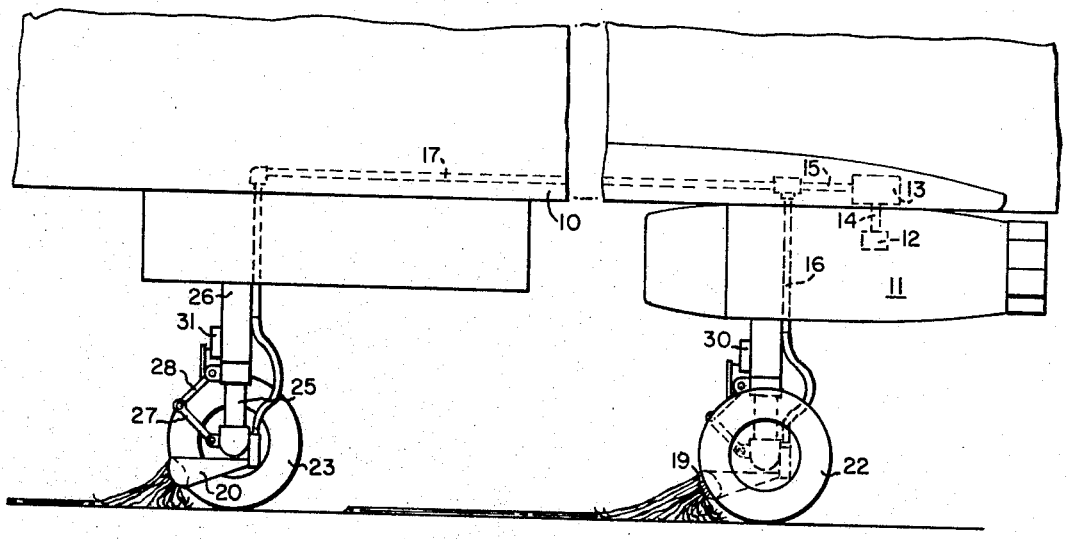
FIGURE 1 is a fragmentary diagrammatic view of a turbine powered aircraft landing gear embodying the invention.
Figure 2:
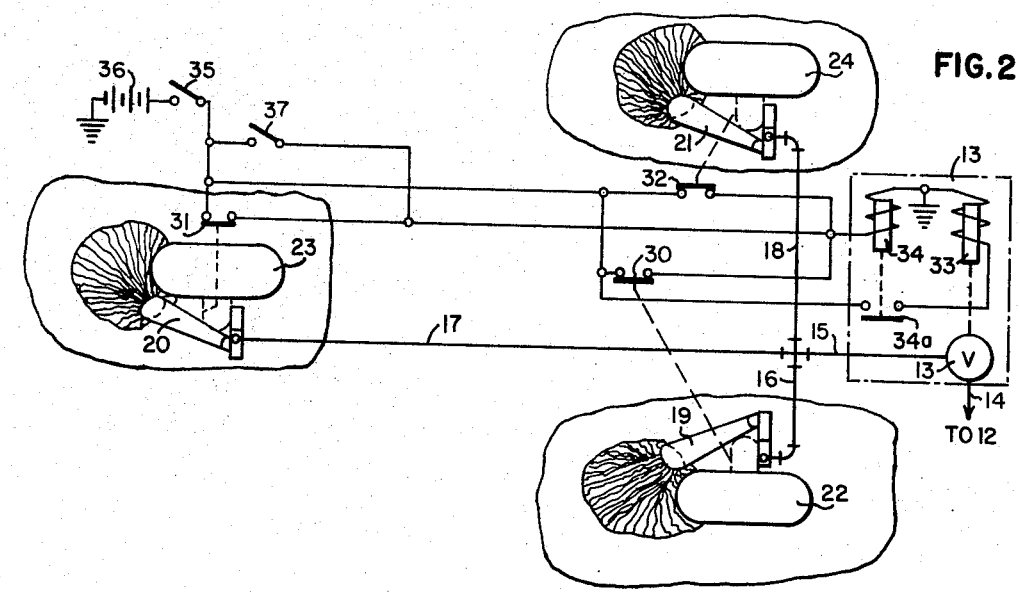
FIGURE 2 is a fragmentary diagramatic plan view similar to FIGURE 1 but also schematically showing the electrical wiring arrangement therefor.

Referring now to FIGURES 1 and 2 of the drawing, an aircraft fuselage is shown at 10 and a turbine jet engine is shown at 11. It should be understood that the invention is not limited to a jet propelled aircraft but may be applied to any aircraft having at least one turbine engine. For example, it will be apparent that the apparatus of this invention may be effectively used on turbo-prop driven aircraft as well as the jet driven planes. Also, it should be understood that the invention is not limited to application to a particular one or number of ones of the landing gear wheels nor to the bleeding of the compressed air from a particular one or number of ones of the one or more gas turbine engines with which the aircraft may be equipped.

It is well known to bleed compressed air from a compressor stage of a gas turbine engine as used to power aircraft for purposes of controlling the turbine engine or for purposes of heating and pressurizing the passenger cabin. It is not intended to limit this invention to any particular bleed valve arrangement for bleeding hot dry compressed air from the turbine engine and, therefore, the bleed arrangement is diagrammatically shown at 12 as connected to a high pressure compressor stage of the turbine. A normally closed solenoid controlled valve is shown at 13 connected in the ducts 14–18 from the turbine compressor bleed 12 for purposes of controlling the flow of compressed air from the turine engine to the various ones of the landing wheel nozzles 19–21.

Each of the nozzles 19–21 is mounted on a respective landing gear strut in a position to direct compressed air forwardly and downwardly in front of the respective landing wheels 22–24 with a predetermined pattern as shown to disperse water on the landing area in front of each wheel. As may be conventional, each landing strut is provided with a sprung piston or oleo strut such as shown at 25 also connected to the main strut 26 by means of the toggle links or scissors members 27, 28. As the weight of the plane comes to rest on each of the respective landing wheels 22–24, the oleo strut associated with each wheel will be compressed to pivot the associated toggle link member such as the member shown at 28 in a manner to engage a respective one of the normally open micro switches 30–32 to close the respective switch such as the switch 31.

The normally closed solenoid controlled bleed valve 13 is shown to include its operating coil 33 which is connected in circuit with relay contacts 34a and the pilot controlled manual toggle switch 35 to the source of power such as the battery 36. The relay coil 34 is adapted to be connected to the battery 36 through any one of the normally open landing gear switches 30–32 and the pilot controlled switch 35. As shown by FIGURE 2 of the drawing, when the plane is supported on all three landing wheels 22–24, all three of the switches 30–32 will be closed and if the pilot controlled switch is also closed the relay coil 34 will be energized to close contacts 34a to energize the bleed valve solenoid 33 and open the bleed valve 13. It will be noted that, with the circuit arrangement of FIGURE 2, as soon as any one of the landing wheels 22–24 touches down on the landing strip, and assuming the pilot controlled switch 35 to be closed, the relay coil 34 and the solenoid valve coil 33 will be automatically energized to open the bleed valve 13 and direct heated compressed air to all of the landing gear nozzles 19–21.

Figure 3:
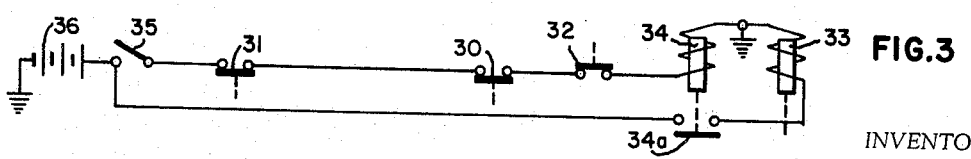
FIGURE 3 is a wiring diagram of a modified control circuit arrangement.

An alternative arrangement is shown by FIGURE 3 of the drawing in which each of the landing gear switches 30–32 is connected in series with each other and the relay coil 34 to the battery 36 so that the valve solenoid 33 cannot be energized until all three landing wheels 22–24 have touched down on the landing strip. Another obvious variation of the invention (not shown) would be to provide respective duct valves for each landing wheel nozzle to be controlled by the respective landing strut switch to be moved to the valve open positions when the respective wheel touches down.

Referring again to FIGURE 2 of the drawing, another modified arrangement for operating the invention would include a second pilot controlled switch 37 connected in parallel to the landing gear switches 30–32 which when closed along with the closure of the pilot controlled switch 35 would by-pass the landing gear switches 30–32 and energize the relay coil 34 and the valve solenoid to open the valve 13 under pilot control whether or not the airplane has touched down. Of course, all of the landing gear switches 30–32 and the second pilot controlled switch 37 may be eliminated and the relay coil 34 connected directly in series with the first pilot controlled switch 35 and the battery 36 if full manual control is all that is required.

Various modifications will occur to those skilled in the art. For example, in place of the solenoid controlled bleed valve 13, mechanical bleed valve arrangements may be used.

What is claimed is:

In a turbine powered aircraft, the landing gear apparatus for dispersing water on the runway during landing comprising bleed means for bleeding compressed air from a high pressure stage of the turbine engine, nozzle means mounted on the landing gear of the aircraft for directing compressed air downwardly with a predetermined pattern in front of the landing gear, duct means connecting said bleed means to said nozzle means, valve means associated with said bleed means and said duct means to control the flow of the compressed air from said bleed means to said nozzle means, said valve means being normally closed and provided with electric control means adapted to be energized to open the valve, and having a source of electrical power, pilot controlled electric switch means, and circuit means connecting said switch means and said electric valve control means to be energized by said source of power when said switch means is closed, normally open electric switch means mounted on the aircraft landing gear in a manner to be closed in response to the weight of the aircraft supported by the landing gear, and circuit means provided to connect said normally open electric switch means in series with said pilot controlled electric switch means together with said source and said electric valve control means whereby when said pilot controlled switch is closed said valve may be energized to open as said aircraft lands and supported on the landing gear in a manner to close said normally open switch means.

References Cited
UNITED STATES PATENTS

| | | | |
|---|---|---|---|
| 2,677,516 | 5/1954 | Pilling | 244—103 |
| 3,182,934 | 5/1965 | Clark | 244—103 |

MILTON BUCHLER, *Primary Examiner.*

P. E. SAUBERER, *Assistant Examiner.*